No. 689,565. Patented Dec. 24, 1901.
W. PRELLWITZ.
REGULATOR FOR AIR COMPRESSORS.
(Application filed Feb. 7, 1901.)
(No Model.) 3 Sheets—Sheet 1.
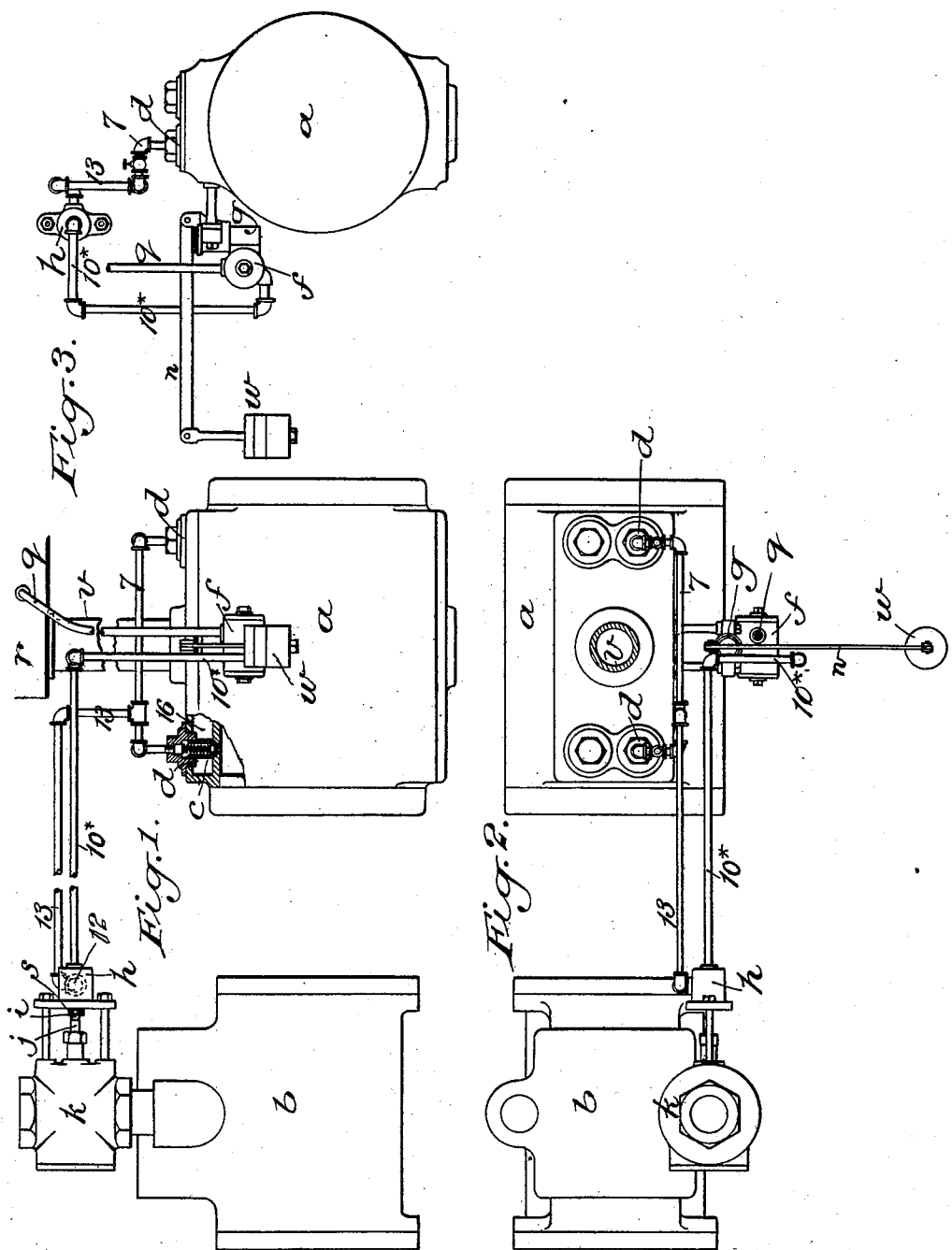

No. 689,565. Patented Dec. 24, 1901.
W. PRELLWITZ.
REGULATOR FOR AIR COMPRESSORS.
(Application filed Feb. 7, 1901.)
(No Model.) 3 Sheets—Sheet 2.

Witnesses:-
George Barry Jr.
Henry Thieme.

Inventor.
William Prellwitz
by attorneys
Brown & Seward

No. 689,565. Patented Dec. 24, 1901.
W. PRELLWITZ.
REGULATOR FOR AIR COMPRESSORS.
(Application filed Feb. 7, 1901.)
(No Model.) 3 Sheets—Sheet 3.
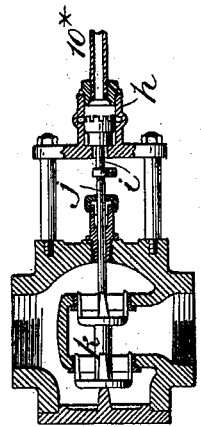
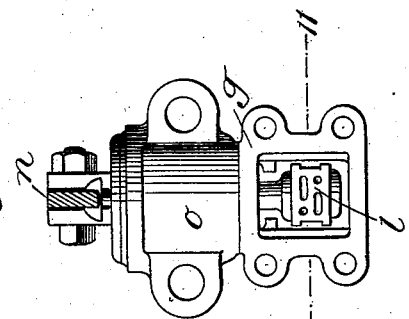
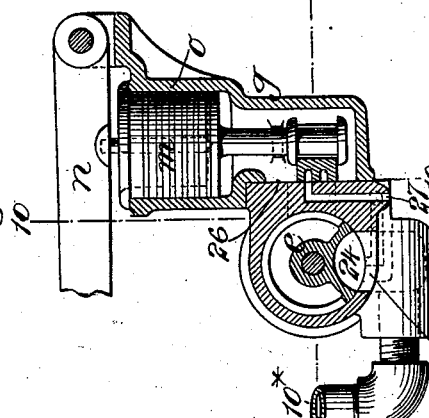
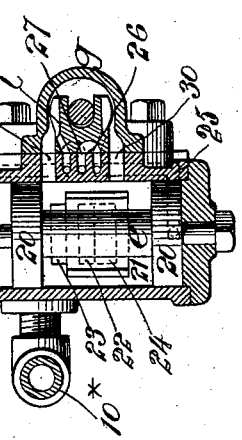
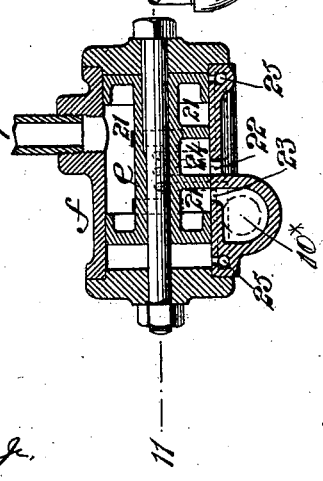
Witnesses:
George Barry Jr.
Henry Thieme
Inventor
William Prellwitz
by attorney
Brown & Seward

UNITED STATES PATENT OFFICE.

WILLIAM PRELLWITZ, OF EASTON, PENNSYLVANIA, ASSIGNOR TO THE INGERSOLL-SERGEANT DRILL COMPANY, OF NEW YORK, N. Y., A CORPORATION OF WEST VIRGINIA.

REGULATOR FOR AIR-COMPRESSORS.

SPECIFICATION forming part of Letters Patent No. 689,565, dated December 24, 1901.

Application filed February 7, 1901. Serial No. 46,316. (No model.)

*To all whom it may concern:*

Be it known that I, WILLIAM PRELLWITZ, a citizen of the United States, and a resident of Easton, in the county of Northampton and State of Pennsylvania, have invented a new and useful Improvement in Regulating Devices for Air-Compressors, of which the following is a specification.

This invention relates to that class of regulating devices for air-compressors which operate in two ways—viz., through the throttle-valve or regulator of a steam-engine or motor which drives the compressor and also through the unloading of the discharge-valves of the compressor of the pressure of the fluid in the receiver into which they discharge when such pressure exceeds a predetermined degree and the renewal of said pressure when it becomes reduced to or below said degree. Examples of such compressor-regulating devices are contained in United States Patents Nos. 415,370 and 514,839.

In both of the examples above referred to the two operations above mentioned are performed simultaneously; but according to the present invention the operation of the regulator of the motor is caused to take place before the corresponding operation of unloading or renewal of the load on the discharge-valves, and by this means the compressor is allowed to run slowly while unloading and to speed up before the load is again thrown on it and is thus prevented both from racing when first relieved from its load and from being stalled when its load is renewed, and it is in the means hereinafter described and claimed by which the two successive operations above referred to are performed that the present invention consists.

Figure 5:
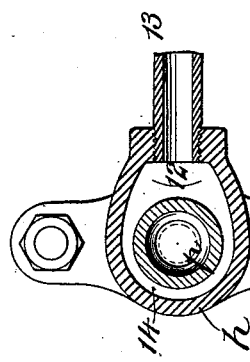
Figure 6:
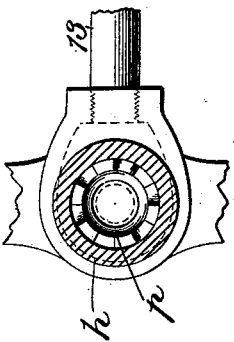
Figure 4:
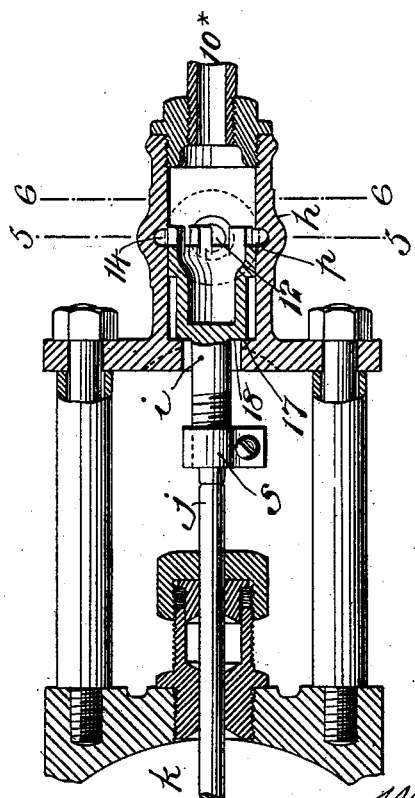
Figure 7:
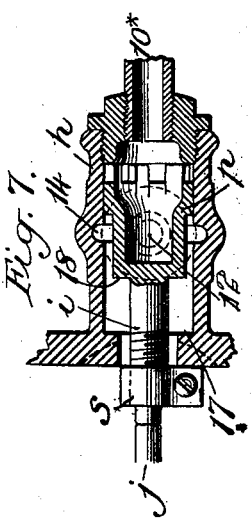

In the accompanying drawings, Figure 1 is a side view representing as much of a compressor and a steam-engine for driving the same as is necessary to illustrate the application of my invention; Fig. 2, a plan corresponding with Fig. 1; Fig. 3, an end view corresponding with Figs. 1 and 2; Fig. 4, a vertical section of the device which operates the throttle-valve or regulator of the steam-engine and controls the times of operation of the unloading-valve; Fig. 5, a transverse section in the line 5 5 of Fig. 4; Fig. 6, a transverse section in the line 6 6 of Fig. 4; Fig. 7, a sectional view corresponding with part of Fig. 4, but showing a different position of parts; Fig. 8, a central vertical section, taken at right angles to Fig. 1 in the line 8 8, of what is hereinafter termed the "compressor-regulator;" Fig. 9, a central vertical section of what is hereinafter termed the "unloading-valve," constituting part of said regulator; Fig. 10, a vertical section at right angles to Fig. 8 in the line 10 10 of that figure as viewed from the left; Fig. 11, a horizontal section in the line 11 11 of Figs. 8, 9, and 10, and Fig. 12 a central vertical section of the throttle-valve of the motor and its appurtenances.

Similar letters and numbers of reference designate corresponding parts in all the figures.

$a$ is the compressor-cylinder, and $b$ the cylinder of the steam-engine which drives the compressor-piston; $r$, the receiver, and $v$ the delivery-pipe from the compressor to the receiver. One of the discharge-valves $c$ of the compressor is represented in Fig. 1, where the discharge-passage 16 and the valve and its box $d$ are shown in section. The valve represented is of a well-known puppet kind, having a hollow cylindrical piston-like extension which fits the cylindrical box $d$. The caps or heads of the discharge-valves at both ends of the cylinder are connected by a pipe 7, which forms communication between all said valves at the backs thereof. Said pipe 7 is made to communicate with the receiver or with the atmosphere by connections with the compressor-regulator (designated as a whole in Figs. 1, 2, and 3 by the letters $f\,g$) and with the cylinder $h$ of a small motor, the rod $i$ of whose piston (see Figs. 4, 7, and 12) abuts against the end of the stem $j$ of the throttle-valve $k$ of the steam-engine $b$.

The compressor-regulator $f\,g$ represented is precisely like that which forms part of the subject-matter of United States Patent No. 514,839; but to explain its operation in the present invention it is illustrated in detail in Figs. 8, 9, 10, and 11. Said regulator comprises two valves—viz., a main valve $e$, hereinafter termed the "unloading-valve," and an auxiliary valve *l*.

The unloading-valve *e* is contained in the cylindrical casing *f*, in which it has a longitudinal reciprocating movement, its ends 20 being formed as piston-heads and fitted to said casing. A space 21 in said casing between said piston-heads (see Figs. 9 and 11) is always in communication with the receiver *r* through a pipe *q*. In the lower part of said casing are two ports 22 23, (see Fig. 9,) of which 22 is always in communication with the atmosphere, and 23 communicates by a pipe 10* with the outer end of the cylinder *h* of the motor which operates the throttle-valve *k* of the engine. A cove 24, which has no communication with the space 21, is provided in the bottom of the valve *e* for the purpose of bringing the ports 22 23 into communication with each other.

The auxiliary valve *l* is a slide-valve and works in a casing *g*, which is always in communication with the space 21 in the unloading-valve casing *f* through openings 30 between the two casings, and consequently said casing *g* is always open to the receiver. The said valve *l* is loaded by a weight *w* on a lever *n*, bearing upon a piston *m*, carried by the stem of said valve and working in a cylinder *o*, provided on the upper part of the casing *g*, the said weight being so adjusted as to counterbalance the receiver-pressure on the bottom of the piston until said pressure exceeds the desired maximum. Said valve and its seat 26 are ported to open to the receiver-pressure in the casing *g* either of the ports 25, leading to the ends of the unloading-valve casing, and to open the other of said ports to the atmosphere through an exhaust-port 27 in the seat 26. This auxiliary valve *l*, operating as will be presently described, produces the operation of the unloading-valve *e* by the induction and eduction through the ports 25 into and from the ends of the casing *f* of air from the receiver, with which the casing *g* is always supplied.

The throttle-valve *k* may be of any known kind, but preferably one such as is shown in United States Patents Nos. 415,370 and 514,839, which is so nearly balanced that it has a slight tendency to be closed by the pressure of steam upon it. Referring to Fig. 1 of the drawings, it is supposed to close or reduce its opening by a movement to the right. The motor-cylinder *h* of this throttle-valve has an opening 12 in one side thereof, through which connection is made by a pipe 13 with the pipe 7, which is always in communication with the backs of the discharge-valves *c*. This opening 12 communicates with an annular passage 14, which runs all around the interior of the cylinder *h*, as shown in Fig. 5. In the inner end of said cylinder *h* there is an opening to the atmosphere, as shown in Figs. 4 and 7, said opening having around it a seat 17 for a valve 18, formed around the rear end of the piston *p*.

It is by the side opening 12 in the motor-cylinder *h* and the pipe 13, forming communication between said opening and the pipe 7, that the unloading and reloading of the discharge-valves of the compressor are delayed until after the operation of the throttle-valve to reduce or increase the speed of the engine, and it is in the provision of the said side opening 12 and additional pipe 13, communicating with the pipe 7, that the present invention differs materially from the regulating devices which are the subject of United States Patent No. 514,839 and in which a pipe corresponding with the pipe 10*, hereinabove referred to, forms the only communication between the throttle-valve motor and the pipe which forms communication with the backs of the discharge-valves of the compressor.

The operation is as follows: During normal conditions when the pressure in the receiver is not above that predetermined the auxiliary valve *l* is held in its lowest position by the weight *w* and the air from the receiver communicates through the auxiliary valve *l* and unloading-valve *e* of the regulator *f g* and through the pipe 10* with the outer end of the cylinder *h* of the throttle-valve motor and by pressure on its piston *p* keeps the throttle-valve open and the valve 18 closed, as shown in Fig. 4, at the same time keeping open the passage 14 and the communication through the opening 12 and pipes 13 and 7 with the backs of the discharge-valves, which are then left exposed to and loaded with the pressure in the receiver. This communication through the unloading-valve *e* may be understood by reference to Fig. 9, where it will be seen that the said valve is held at the right-hand end of its casing *f* by the pressure admitted to the left-hand end of the casing through the port 25 at that end, and there is free communication through the space 21 between the pipes *q* and 10*. Now suppose an excessive pressure to occur in the receiver sufficient to overcome the weight *w* the auxiliary valve *l* of the regulator is raised by its attached piston, and air from the receiver is thereby admitted to the right-hand end of the casing *f* of the unloading-valve, and the left-hand end of said casing is opened to the atmosphere through the exhaust-port 27. The unloading-valve *e* then moves to the left, thus opening communication between the outer end of the cylinder *h* and the atmosphere through the pipe 10*, port 23, cove 24, and port 22, and thus at once liberating the piston *p* from the receiver-pressure, which had been acting through the pipe 10* to hold the throttle-valve *k* open. The throttle-valve now at once begins to be closed by the pressure to which it is normally subject in its closing direction and as it closes its stem *j*, bearing on the rod *i* of the piston *p*, presses the said piston outward, causing the opening of the valve 18. As the piston continues to be so moved outward, it passes the annular passage 14 in the cylinder *h*, and so opens communication from the atmosphere through the open end of cylinder $h$ and through passage 14, opening 12, and pipes 13 and 7 to the backs of the discharge-valves, and thus unloads the said valves. It will thus be understood that the communication between the backs of the discharge-valves and the atmosphere for the unloading of said valves cannot take place until after the commencement of the closing movement or contraction of the opening of the throttle-valve. Conversely, when the pressure in the receiver is reduced to the normal and the weight $w$ brings back the auxiliary valve $l$ to the position for reversing the unloading-valve $e$ and opening communication between the receiver and the motor-cylinder $h$ of the throttle-valve the opening of the throttle-valve by the inward movement of the piston $p$ takes place before the closing by the said piston of the passage 14 in the cylinder to the atmosphere and the consequent reloading of the discharge-valves. Hence the action of the regulator of the steam engine or motor of the compressor always takes places before the action of the regulator of the compressor itself. In this operation the piston $p$ of the throttle-valve, opening and closing the passage 14 and pipe 13, acts as a timing-valve to time the operation of the unloading-valve after the operation of the throttle-valve.

The closing of the throttle-valve is limited by an adjustable stop $s$ on the piston-rod $i$ of its motor, which stop may come into contact with the inner end of the cylinder $h$.

By the term "air-compressor" used in this specification I intend to include compressors for all aeriform or gaseous fluids.

What I claim as my invention is—

1. The combination with an air-compressor the discharge-valves of which are subject to fluid-pressure tending to close them, a receiver into which said compressor discharges and a motor for driving said compressor, of an unloading-valve for said discharge-valves, a regulator for said motor and means controlled by the receiver-pressure for producing first the operation of said regulator and afterward the operation of the unloading-valve, substantially as herein described.

2. The combination with an air-compressor the discharge-valves of which are subject to fluid-pressure tending to close them, a receiver into which said compressor discharges and a steam-engine for driving said compressor, of a throttle-valve for said engine, an unloading-valve for said discharge-valves and means controlled by the receiver-pressure through said unloading-valve to first close or open the throttle-valve and afterward to unload the receiver-pressure from or restore said pressure to the discharge-valves, substantially as herein described.

3. The combination with an air-compressor the discharge-valves of which are subject to fluid-pressure tending to close them, a steam-engine for driving said compressor, a receiver to which said compressor delivers and a throttle-valve for said engine, of a motor consisting of a cylinder and piston for controlling said throttle-valve, a pipe forming communication between the backs of said discharge-valves, a pipe forming communication between the first-mentioned pipe and one side of the cylinder of said motor, and valve-controlled pipes between the receiver and one end of said cylinder, the other end of said cylinder being open to the atmosphere, substantially as and for the purpose herein described.

4. The combination with an air-compressor the discharge-valves of which are subject to fluid-pressure tending to close them, a receiver into which said compressor discharges and a steam-engine for driving said compressor, of an unloading-valve operated by the receiver-pressure, a throttle-valve for said engine, a motor for said throttle-valve, said motor consisting in part of a cylinder in free communication at one end with the atmosphere and having in its side an opening in communication with the backs of the discharge-valves and in part of a piston working in said cylinder, and communications controlled by said unloading-valve between the other end of said cylinder and the receiver, the said piston being also a valve for opening and closing communication between the backs of the discharge-valves and the atmosphere to time the operation of unloading the discharge-valves after the operation of the throttle-valve, substantially as herein described.

In testimony that I claim the foregoing as my invention I have signed my name, in presence of two witnesses, this 4th day of February, 1901.

WILLIAM PRELLWITZ.

Witnesses:
 FREDK. HAYNES,
 LIDA M. EGBERT.